United States Patent …

(12) United States Patent
Zheng et al.

(10) Patent No.: US 10,744,880 B2
(45) Date of Patent: Aug. 18, 2020

(54) NEGATIVE VOLTAGE BACKFLOW DIRECT CURRENT SUPPLY SYSTEM FOR RAIL TRANSPORT

(71) Applicants: Beijing Efficiengine Technology LLC, Beijing (CN); Beijing Jiaotong University, Beijing (CN)

(72) Inventors: Qionglin Zheng, Beijing (CN); Xiaofeng Yang, Beijing (CN); Xiaojie You, Beijing (CN); Ruixiang Hao, Beijing (CN); Hong Li, Beijing (CN)

(73) Assignees: Beijing Efficiengine Technology LLC, Beijing (CN); Beijing Jiaotong University, Beijing (CN)

( * ) Notice: Subject to any disclaimer, the term of this patent is extended or adjusted under 35 U.S.C. 154(b) by 273 days.

(21) Appl. No.: 15/746,519

(22) PCT Filed: Jun. 22, 2016

(86) PCT No.: PCT/CN2016/000334
§ 371 (c)(1),
(2) Date: Jan. 22, 2018

(87) PCT Pub. No.: WO2017/012284
PCT Pub. Date: Jan. 26, 2017

(65) Prior Publication Data
US 2018/0208063 A1    Jul. 26, 2018

(30) Foreign Application Priority Data
Jul. 22, 2015  (CN) .......................... 2015 1 0435085

(51) Int. Cl.
*B60L 9/00* (2019.01)
*B60M 3/06* (2006.01)

(52) U.S. Cl.
CPC .............. *B60L 9/00* (2013.01); *B60M 3/06* (2013.01); *B60L 2200/26* (2013.01); *B60L 2210/42* (2013.01); *Y02T 10/7241* (2013.01)

(58) Field of Classification Search
CPC ...... B60L 9/00; B60L 9/02; B60L 9/04; B60L 50/00; B60L 50/10; B60L 50/11; B60L 50/53
See application file for complete search history.

(56) References Cited

U.S. PATENT DOCUMENTS 4,463,400 A * 7/1984 Paice ................... H01H 33/596
307/134
5,598,935 A    2/1997 Harrison et al.
(Continued)

FOREIGN PATENT DOCUMENTS

CN    2403619 Y    11/2000
CN    1697778 A    11/2005
(Continued)

OTHER PUBLICATIONS

International Search Report dated Jan. 26, 2017, in International Application No. PCT/CN2016/000334 with English translation.
(Continued)

*Primary Examiner* — Robert J McCarry, Jr.
(74) *Attorney, Agent, or Firm* — Ramey & Schwaller LLP; William P. Ramey

(57) ABSTRACT

A negative voltage backflow direct current supply system for a rail transport is provided. The system adds a negative voltage return line and a DC converter for realizing negative voltage backflow current based on traditional DC power supply system. The negative voltage backflow line replaces the backflow line of running rail in the traditional DC power supply system, which can greatly reduce or eliminate the stray current in the traditional DC power supply system and the negative influence of too high ground potential of
(Continued)

running rail. At the same time, the DC converter can be used as regenerative braking energy storage device of train to improve the regenerative braking energy utilization efficiency of DC power supply system and maintain the voltage stability of DC power supply system of rail transport.

10 Claims, 10 Drawing Sheets

(56) References Cited

U.S. PATENT DOCUMENTS

| | | | | |
|---|---|---|---|---|
| 2005/0264266 | A1* | 12/2005 | Nakagawa | H02M 7/08 322/25 |
| 2018/0208063 | A1* | 7/2018 | Zheng | B60L 9/00 |

FOREIGN PATENT DOCUMENTS

| | | |
|---|---|---|
| CN | 202729612 A | 2/2013 |
| CN | 203186126 U | 9/2013 |
| CN | 103539025 A | 1/2014 |
| CN | 103552487 A | 2/2014 |
| CN | 104009657 A | 8/2014 |
| CN | 104326383 A | 2/2015 |
| CN | 104986057 A | 10/2015 |
| JP | H1149484 A | 2/1999 |
| JP | 2000147048 A | 5/2000 |

OTHER PUBLICATIONS

Written Opinion of International Searching Authority dated Jan. 26, 2017, in International Application No. PCT/CN2016/000334 with English translation.

Chen, Jinging et al., "Study on Earth Return Circuit of Common Power Supply Modes of High-Speed Railway" vol. 35, No. 10, Oct. 15, 2007, ISSN: 1006-9178, pp. 24-26, cited in Written Opinion.

International Preliminary Report on Patentability dated Jan. 23, 2018, in International Application No. PCT/CN2016/000334 with English translation.

Chinese Office Action dated Oct. 28, 2016 for Chinese Application No. 201510435085.0 with English translation.

Chinese Issue Notification dated Mar. 1, 2017 for Chinese Application No. 201510435085.0 with English translation.

* cited by examiner

NEGATIVE VOLTAGE BACKFLOW DIRECT CURRENT SUPPLY SYSTEM FOR RAIL TRANSPORT

RELATED APPLICATIONS

This application is the United States National Phase of International Application PCT/CN2016/000334, filed Jun. 22, 2016. This application also includes a claim of priority to Chinese Application No. 201510435085.0, filed Jul. 22, 2015.

FIELD

The invention relates to the technical field of electrified rail transit and power electronic DC conversion, in particular, a negative voltage backflow direct current-supply system for the rail transport.

BACKGROUND

The power supply system of electrified rail transport in the world is divided into two ways: DC power supply and AC power supply. The trunk line rail transport (also called large railway) adopting electrified lines has both DC power supply mode and AC power supply mode. The urban rail transport (including Metro and light rail) with electrified lines adopts DC power supply mode. For the DC power supply system of trunk rail transport, the power supply voltage is generally 3000V, and for urban rail transit's, the power supply voltage is generally 1500V or 750V. Two kinds of voltage system for DC power supply system of urban rail transport exist in our country. In cities like Beijing and Tianjin that built metro in the early days, the power supply system of many urban rail transport line is DC 750V. While in cities like Shanghai and Guangzhou that built metro in late days, the power supply system of urban rail transport line is DC 1500V. For rail transport line with DC supply voltage of 1500V or 3000V, overhead contact line is often used as supply line for train's power supply. While for rail transport line with DC supply voltage of 750V, electric contact rail (because a train usually needs two running rails, it is also called "third rail") is often used as supply line for train's power supply.

With the economic development and social progress, the problem of traffic congestion in large and medium-sized city all over the world are becoming more and more serious. The construction of urban rail transport, such as metro or light rail, has become one of the most effective ways to solve the problem. At present, more than 30 cities in our country have begun to build urban rail transport. By the end of 2014, there were 88 urban rail transport systems operating in 21 cities, with a total mileage of 2787.25 km.

No matter trunk line rail transport or urban rail transport, as long as the use of DC power supply system, so far, in addition that the urban transport in Singapore adopts the fourth rail as the backflow line, in other countries and regions, basically the running rail of train is used as the backflow line (running rail backflow line. The following problems often occur in the DC power supply system using the running rail return line:

(1) The traction backflow current of DC traction substation returned from the train will enter the ballast bed through the bad area where the running rail is poorly insulated, forming stray current. Stray current can cause electrochemical corrosion to the running rail, the reinforcing steel of the whole ballast bed, structural reinforcement of tunnel, the reinforcement of the bridge and the metal equipment along the urban rail, and then affects the service life of the building structure and metal equipment along urban rail transport.

(2) Due to the relatively large resistivity of the steel material of the running rail, there exists a problem that ground potential of running rail is too high when running through a large current, which leads to frequent action of the potential limiter of the running rail.

In addition, in the DC power supply system of the rail transport, the regenerative braking energy is not fully utilized. A large number of regenerative braking energy is consumed by the braking resistor in the form of heating, which not only causes great waste, but also brings about the temperature rise of the tunnel when the underground line is running Therefore, Regenerative braking energy is recycled by energy feedback device or super capacitor energy storage device, which is the main method to solve this problem. But the energy feedback device (energy feedback grid) involves many engineering problems, and the super capacitor energy storage device occupies too much space.

SUMMARY

The foregoing has outlined rather broadly the features of the present disclosure in order that the detailed description that follows may be better understood. Additional features and advantages of the disclosure will be described hereinafter, which form the subject of the claims.

In view of the defects in the prior technology, the aim of the present invention is to provide a negative voltage backflow current DC power supply system for the rail transport, which adds a negative voltage backflow line and a DC converter for realizing negative voltage backflow current on the basis of traditional DC power supply system. The negative voltage backflow line replaces the backflow line of running rail in the traditional DC power supply system, which can greatly reduce or eliminate the stray current in the traditional DC power supply system and the negative influence of too high ground potential of running rail. It can greatly reduce the loss of power line and increase the power supply distance of DC traction substation. At the same time, the DC converter can be used as regenerative braking energy storage device of train to improve the regenerative braking energy utilization efficiency of DC power supply system and maintain the voltage stability of DC power supply system of rail transport. In order to achieve the above goal, the technical scheme adopted by the invention is a negative voltage backflow current DC power supply system for the rail transport, whose characteristics mainly include: DC traction substation with two-level output or three-level output 1, a positive voltage feeder 2, a running rail 3, a negative voltage backflow line 4 and a DC converter.

The described negative voltage backflow line (4) is arranged along the running rail. Several described DC converters are arranged along the running rail. When the DC traction substation is two-level output, the connecting mode is: the positive end 11 of the DC traction substation 1 is connected to the positive voltage feeder 2, and the negative end 12 of the DC traction substation 1 is connected to the running rail 3, and high potential terminal 51 of the DC converter 5 is connected to the positive voltage feeder 2, and neutral potential terminal 53 of the DC converter 5 is connected to the running rail 3, and low potential terminal 52 of the DC converter 5 is connected to the negative voltage backflow line 4.

When the DC traction substation is three-level output, the connecting mode is: the positive end 11 of the DC traction substation 1 is connected to the positive voltage feeder 2, and the midpoint end 13 of the DC traction substation 1 is connected to the running rail 3, and the negative end 12 of the DC traction substation 1 is connected to the negative voltage backflow line 4, and high potential terminal 51 of the DC converter 5 is connected to the positive voltage feeder 2, and neutral potential terminal 53 of the DC converter 5 is connected to the running rail 3, and low potential terminal 52 of the DC converter 5 is connected to the negative voltage backflow line 4.

On the basis of the above technical scheme, when the current of the DC converter 5 flows in from the neutral potential terminal 53, it flows out from the high potential terminal 51 and the low potential terminal 52 simultaneously. On the other hand, when the current of the DC converter 5 flows out from the neutral potential terminal 53, it flows in from the high potential terminal 51 and the low potential terminal 52 simultaneously. The voltage value between the high potential terminal 51 and the neutral potential terminal 53 can be equal or unequal to the value between the neutral potential terminal 53 and the low potential terminal 52, but the equal has the priority. When the values are equal, the current values of the high potential terminal (51) and the low potential terminal (52) simultaneously flows in or flows out from are also equal.

On the basis of the above technical scheme, the number of DC converter 5 and the distance of a running rail section between the two adjacent DC converters 5 are determined by the number of output level of the DC traction substation 1, the length of power supply line, train's load and train running rail interval and other factors. The running rail section between the two adjacent DC converters 5 or between the DC converter 5 and the DC traction substation 1 only for one train running is optimization of the distance of running rail section.

On the basis of the above technical scheme, when the DC traction substation is two-level output and there is a train on the running rail. In the case that at least one section of the most adjacent running rail sections on both sides of the connecting point between the neutral potential terminal 53 of the DC converter 5 which is not most adjacent to DC traction substation 1 and the running rail 3 has a train 6 running, the DC converter 5 transfers the current from the train 6 to the running rail 3 into output of high potential terminal 51 and output of low potential terminal 52 through input of the neutral potential terminal 53, of which output current of high potential terminal 51 is fed back to the train 6, and output current of low potential terminal 52 is transmitted to the negative voltage backflow line 4.

The DC converter 5 which is the most adjacent to DC traction substation 1 converts the current of the negative voltage backflow line 4 flowed from the low potential terminal 52 and the current of the positive voltage feeder 2 flowed from the high potential terminal 51 into the output current of the neutral potential terminal 53. Then this output current is directly returned to the DC traction substation 1 which supplies power for the train 6.

In the case that the most adjacent running rail sections on both sides of the connecting point between the neutral potential terminal 53 of the DC converter 5 which is not most adjacent to DC traction substation 1 and the running rail 3 has no train 6 running, there is no current on the sections and three terminals of the DC converter 5.

On the basis of the above technical scheme, when the neutral potential terminal 53 of the DC converter 5 which is the most adjacent to DC traction substation 1 is connected to the running rail 3 after being connected to the negative end 12 of the DC traction substation 1, and when the running rail has a train running, the current of the most adjacent running rail sections on both sides of the connecting point between the DC traction substation 1 and the running rail 3 is minimum.

On the basis of the above technical scheme, when the DC traction substation is three-level output and there is a train on the running rail. In the case that at least one section of the most adjacent running rail sections on both sides of the connecting point between the neutral potential terminal 53 of the DC converter 5 and the running rail 3 has a train 6 running, the DC converter 5 transfers the current from the train 6 to the running rail 3 into output of high potential terminal 51 and output of low potential terminal 52 through input of the neutral potential terminal 53, of which output current of high potential terminal 51 is fed back to the train 6, and output current of low potential terminal 52 is directly returned to the DC traction substation 1 through its negative end 12 after being transmitted to the negative voltage backflow line 4.

In the case that the most adjacent running rail sections on both sides of the connecting point between the neutral potential terminal 53 of the DC converter 5 which is not most adjacent to DC traction substation 1 and the running rail 3 has no train 6 running, there is no current on the sections and three terminals of the DC converter 5.

On the basis of the above technical scheme, when the neutral potential terminal 53 of the DC converter 5 which is the most adjacent DC traction substation 1 and the midpoint end 13 of the DC traction substation 1 are respectively connected to the rail line 3, and when the running rail section between these two connecting points has a train 6 running, the current from the positive end 11 of the DC traction substation 1 and the current from the negative end 12 are not equal.

On the basis of the above technical scheme, the described DC converter 5 contains two sets of capacitors C51 and C52, of which the capacitor C51 is connected between the high potential terminal 51 and the neutral potential terminal 53 of the DC converter 5, and the capacitor C52 is connected between the neutral potential terminal 53 and the low potential terminal 52 of the DC converter 5.

On the basis of the above technical scheme, after the capacitors C51 and C52 of the DC converter are replaced or partially replaced by the energy storage unit such as super capacitor or battery, the DC converter 5 not only has a function of negative voltage conversion, but also has a function of regenerative braking energy storage in train.

The negative voltage backflow current DC power supply system for the rail transport described herein adds a negative voltage backflow line and a DC converter for realizing negative voltage backflow current on the base of traditional DC power supply system. The negative voltage backflow line replaces the backflow line of running rail in the traditional DC power supply system, which greatly reduce or eliminate the stray current in the traditional DC power supply system and the negative influence of too high ground potential of running rail. It can greatly reduce the loss of power line and increase the power supply distance of DC traction substation. At the same time, the DC converter can be used as regenerative braking energy storage device of train to improve the regenerative braking energy utilization efficiency of DC power supply system and maintain the voltage stability of DC power supply system of rail transport.

Compared with the existing technology, this invention effectively overcomes the stray current caused by using the running rail as the backflow line in the existing DC power supply system of the rail transport, which is beneficial to improve the service life of the building structure and the metal equipment of the rail transport, and effectively reduce the hidden danger of too high ground potential of running rail. By adding DC converters and a negative voltage backflow line, without the need to increase the level of insulation under the existing locomotive, power supply distance of power supply line can be effectively increased, which can reduce current rating of DC power supply line. In addition, after the capacitor in DC converter is replaced by super capacitor or battery and other energy storage unit, it not only has a function of negative voltage conversion, but also has a function of regenerative braking energy storage device, which improves the regenerative braking energy utilization efficiency of the DC power supply system with no need to add other energy storage devices.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which:

FIG. 1 (b) is a schematic diagram of Scheme 1 of traditional DC traction power supply when running one train;

FIG. 1 (c) is a schematic diagram of Scheme 1 of traditional DC traction power supply when running two trains;

FIG. 2 (b) is a schematic diagram of Scheme 2 of traditional DC traction power supply when running one train;

FIG. 2 (c) is a schematic diagram of Scheme 2 of traditional DC traction power supply when running two trains;

FIG. 3 (b) is a schematic diagram 1 of Example 1 of Scheme 1 of this invention when running one train;

FIG. 3 (c) is a schematic diagram 2 of Example 1 of Scheme 1 of this invention when running one train;

FIG. 3 (d) is a schematic diagram of Example 2 of Scheme 1 of this invention;

FIG. 4 (b) is a schematic diagram 1 of Example 1 of Scheme 2 of this invention when running one train;

FIG. 4 (c) is a schematic diagram 2 of Example 1 of Scheme 2 of this invention when running one train;

FIG. 4 (d) is a schematic diagram of Example 2 of Scheme 2 of this invention;

FIG. 4 (e) is a schematic diagram of Example 3 of Scheme 2 of this invention;

FIG. 5 (b) is a schematic diagram 1 of Example 1 of Scheme 3 of this invention when running one train;

FIG. 5 (c) is a schematic diagram 2 of Example 1 of Scheme 3 of this invention when running one train;

FIG. 5 (d) is a schematic diagram of Example 2 of Scheme 3 of this invention;

FIG. 6 (b) is a schematic diagram 1 of Example 1 of Scheme 4 of this invention when running one train;

FIG. 6 (c) is a schematic diagram 2 of Example 1 of Scheme 4 of this invention when running one train;

FIG. 6 (d) is a schematic diagram of Example 2 of Scheme 4 of this invention;

FIG. 6 (e) is a schematic diagram of Example 3 of Scheme 4 of this invention;

FIG. 7 (b) is a schematic diagram of Example 2 of negative voltage DC converter of this invention;

FIG. 8 (b) is a schematic diagram of Example 2 of a switch in a negative voltage DC converter.

DETAILED DESCRIPTION

In order to describe the invention more concretely, the technical scheme of the invention is described in more details in combination with the figures and the concrete implementation methods. It should be emphasized that the following illustration is only illustrative, not intended to limit the scope of the invention and its application.

Figure 1:
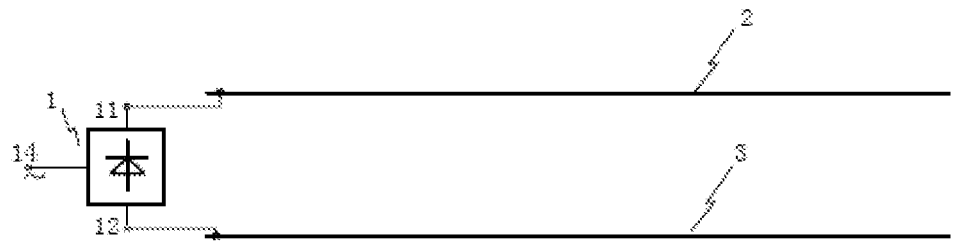
FIG. 1 (a) is a schematic diagram of Plan 1 of traditional DC traction power supply.
Figure 1:
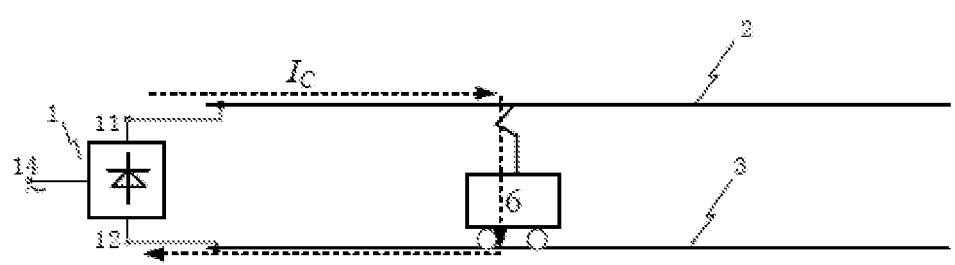
Figure 1:
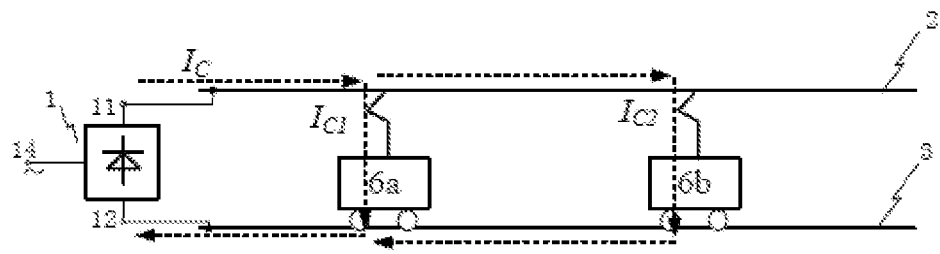

In Scheme 1 of traditional DC traction power supply as shown in FIG. 1 (a, b, c), the DC power supply system of rail transport adopts two-level output of DC traction substation for the unilateral power supply, including: the DC traction substation 1, the positive voltage feeder 2 and the running rail 3 which are responsible for the transmission of electric energy to the train 6, a negative voltage backflow line 4 and a DC converter, of which the running rail 3 also has a function of backflow line of DC traction substation.

The DC traction substation 1 is the two-level output, and the positive end 11 is connected with the positive voltage feeder 2; the negative end 12 is connected with the running rail 3, and the AC end is connected with the AC input power supply. The DC traction substation 1 adopts multi pulse rectifier device, and the typical multi pulse rectifier devices are 24 pulses, 12 pulses or 18 pulses.

In FIG. 1 (a, b, c), only one DC traction substation is connected to a section of power supply line (including the positive voltage feeder 2 and the running rail 3, etc.), so it is called unilateral power supply.

As shown in FIG. 1 (b), in Scheme 1 of the traditional DC traction power supply when running one train, the traction current Ic flows from the positive end 11 of the DC traction substation 1 to the positive voltage feeder 2. After it reaches the train 6, the traction return current flows into the running rail 3 between the train 6 and the DC traction substation 1 and finally returns to the DC traction substation 1 from the negative end 12 of the DC traction substation 1, forming a complete DC power supply circuit.

As shown in FIG. 1 (c), in Scheme 1 of the traditional DC traction power supply when running two trains, the traction current Ic flows from the positive end 11 of the DC traction substation 1 to the positive voltage feeder 2. A part of the current Ic1 reaches the train 6a, and the traction backflow current flows into the running rail 3 between the train 6a and the DC traction substation 1. The other part of the current Ic2 reaches the train 6b, and the traction backflow current flows into the running rail 3 between the train 6b and the DC traction substation 1. The current Ic1 and Ic2 finally backflow to DC traction substation 1 from the negative end 12 of the DC traction substation 1, forming a complete DC power supply circuit.

Figure 2:
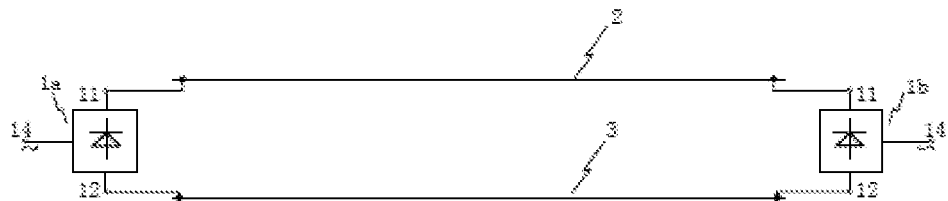
FIG. 2 (a) is a schematic diagram of Scheme 2 of traditional DC traction power supply.
Figure 2:
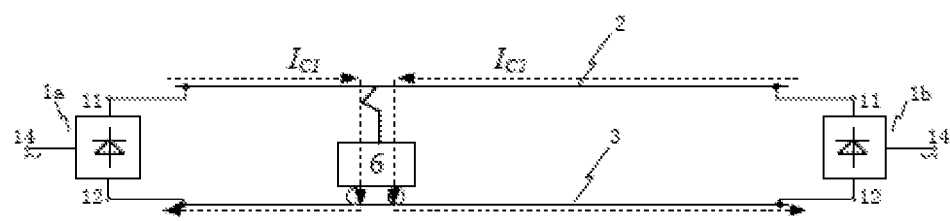
Figure 2:
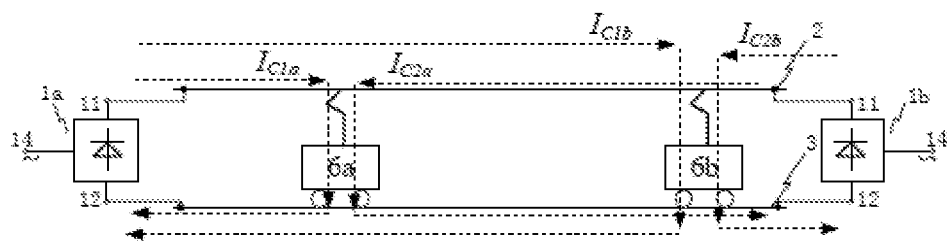

In Scheme 2 of traditional DC traction power supply as shown in FIG. 2 (a, b, c), the DC power supply system of rail transport adopts two-level output of DC traction substation for the bilateral power supply, including: the DC traction substation 1a and 1b, the positive voltage feeder 2 and the running rail 3 which are responsible for the transmission of electric energy to the train, of which the running rail 3 also has a function of backflow line of DC traction substation.

The DC traction substation 1a and 1b are the two-level output, and the positive ends 11 of the DC traction substation 1a and 1b are respectively connected with the positive voltage feeder 2; the negative ends 12 of the DC traction substation 1a and 1b are respectively connected with the running rail 3, and the AC ends 14 of the DC traction substation 1a and 1b are respectively connected with the AC input power supply. The DC traction substation adopts multi pulse rectifier device, and the typical multi pulse rectifier devices are 24 pulses, 12 pulses or 18 pulses.

In FIG. 2 (a, b, c), two DC traction substation is connected at both ends of a section of power supply line (including the positive voltage feeder 2 and the running rail 3, etc.), so it is called bilateral power supply.

As shown in FIG. 2 (b), in Scheme 2 of the traditional DC traction power supply when running one train, the traction current Ic1 flows from the positive end 11 of the DC traction substation 1a to the positive voltage feeder 2. After it reaches the train 6, the traction backflow current flows into the running rail 3 between the train 6 and the DC traction substation 1a, and finally returns to the DC traction substation 1a from the negative end 12 of the DC traction substation 1a. At the same time, the traction current Ic2 flows from the positive end 11 of the DC traction substation 1b to the positive voltage feeder 2. After it reaches the train 6, the traction backflow current flows into the running rail 3 between the train 6 and the DC traction substation 1b, and finally returns to the DC traction substation 1b from the negative end 12 of the DC traction substation 1b. Two parts of currents together form a complete DC power supply circuit.

As shown in FIG. 2 (b), the current of the train 6 is taken from the two DC traction substations 1a and 1b when the power supply is bilateral. Therefore, the current of the positive voltage feeder and the backflow line of the running rail when the power supply is bilateral are smaller than that when the power supply is unilateral.

As shown in FIG. 2 (c), in Scheme 2 of the traditional DC traction power supply when running two train. For the train 6a: the traction current Ic1a flows from the positive end 11 of the DC traction substation 1a to the positive voltage feeder 2. After it reaches the train 6a, the traction backflow current flows into the running rail 3 between the train 6a and the DC traction substation 1a and finally returns to the DC traction substation 1a from the negative end 12 of the DC traction substation 1a. At the same time, the traction current Ic2a flows from the positive end 11 of the DC traction substation 1b to the positive voltage feeder 2. After it reaches the train 6a, the traction backflow current flows into the running rail 3 between the train 6a and the DC traction substation 1b, and finally returns to the DC traction substation 1b from the negative end 12 of the DC traction substation 1b.

For the train 6b: the traction current Ic1b flows from the positive end 11 of the DC traction substation 1a to the positive voltage feeder 2. After it reaches the train 6b, the traction backflow current flows into the running rail 3 between the train 6b and the DC traction substation 1a and finally returns to the DC traction substation 1a from the negative end 12 of the DC traction substation 1a. At the same time, the traction current Ic2b flows from the positive end 11 of the DC traction substation 1b to the positive voltage feeder 2. After it reaches the train 6b, the traction backflow current flows into the running rail 3 between the train 6b and the DC traction substation 1b, and finally returns to the DC traction substation 1b from the negative end 12 of the DC traction substation 1b. Thus, a complete DC power supply circuit is formed.

In view of the traditional DC traction power supply schemes of FIG. 1 (a, b, c) and Fig. a (a, b, c), the invention adopts the following improvement schemes: A negative voltage backflow current DC power supply system for the rail transport described in the invention mainly includes: DC traction substation with two-level output or three-level output 1, a positive voltage feeder 2, a running rail 3, a negative voltage backflow line 4 and a DC converter 5. The described negative voltage backflow line 4 is arranged along the running rail. Several described DC converters 5 are arranged along the running rail. The described DC converter 5 comprises a high potential terminal 51, a low potential terminal 52 and a neutral potential terminal 53.

When the DC traction substation is two-level output, the connecting mode is: the positive end 11 of the DC traction substation 1 is connected to the positive voltage feeder 2, and the negative end 12 of the DC traction substation 1 is connected to the running rail 3, and high potential terminal 51 of the DC converter 5 is connected to the positive voltage feeder 2, and neutral potential terminal 53 of the DC converter 5 is connected to the running rail 3, and low potential terminal 52 of the DC converter 5 is connected to the negative voltage backflow line 4.

When the DC traction substation is three-level output, the connecting mode is: the positive end 11 of the DC traction substation 1 is connected to the positive voltage feeder 2, and the midpoint end 13 of the DC traction substation 1 is connected to the running rail 3, and the negative end 12 of the DC traction substation 1 is connected to the negative voltage backflow line 4, and high potential terminal 51 of the DC converter 5 is connected to the positive voltage feeder 2, and neutral potential terminal 53 of the DC converter 5 is connected to the running rail 3, and low potential terminal 52 of the DC converter 5 is connected to the negative voltage backflow line 4.

The running rail 3 is divided into different sections by connecting points of the DC traction substation 1 and several DC converters 5 and the running rail 3, and the running rail between the adjacent connecting points is called "the running rail section".

The voltage value between the high potential terminal 51 and the neutral potential terminal 53 can be equal or unequal to the value between the neutral potential terminal 53 and the low potential terminal 52, but the equal has the priority.

The described DC converter is used to realize negative voltage backflow current. According to whether the DC converter is the most adjacent to the DC traction substation and the location of the train, etc., the specific analysis is as follows:

Case 1: when the DC traction substation 1 is two-level output and there is a train 6 on the running rail 3.

1.1 In the case that at least one section of the most adjacent running rail sections on both sides of the connecting point between the neutral potential terminal 53 of the DC converter 5 which is not most adjacent to the DC traction substation 1 and the running rail 3 has a train 6 running, the DC converter 5 transfers the current from the train 6 to the running rail 3 into output of high potential terminal 51 and output of low potential terminal 52 through input of the neutral potential terminal 53, of which output current of high potential terminal 51 is fed back to the train 6, and output current of low potential terminal 52 is transmitted to the negative voltage backflow line 4.

1.2 The DC converter 5 which is the most adjacent to DC traction substation 1 converts the current of the negative voltage backflow line 4 flowed from the low potential terminal 52 and the current of the positive voltage feeder 2 flowed from the high potential terminal 51 into the output current of the neutral potential terminal 53. Then this output current is directly returned to the DC traction substation 1 which supplies power for the train 6.

1.3 In the case that the most adjacent running rail sections on both sides of the connecting point between the neutral potential terminal 53 of the DC converter 5 which is not most adjacent to DC traction substation 1 and the running rail 3 has no train 6 running, there is no current on the sections and three terminals of the DC converter 5.

Case 2: when the DC traction substation is three-level output and there is a train on the running rail.

2.1 In the case that at least one section of the most adjacent running rail sections on both sides of the connecting point between the neutral potential terminal 53 of the DC converter 5 and the running rail 3 has a train 6 running, the DC converter 5 transfers the current from the train 6 to the running rail 3 into output of high potential terminal 51 and output of low potential terminal 52 through input of the neutral potential terminal 53, of which output current of high potential terminal 51 is fed back to the train 6, and output current of low potential terminal 52 is directly returned to the DC traction substation 1 through its negative end 12 after being transmitted to the negative voltage backflow line 4

2.2 In the case that the most adjacent running rail sections on both sides of the connecting point between the neutral potential terminal 53 of the DC converter 5 which is not most adjacent to DC traction substation 1 and the running rail 3 has no train 6 running, there is no current on the sections and three terminals of the DC converter 5.

Obviously, when there is no train 6 running on the running rail section between the two adjacent DC converters 5, there is no current flow on the section, i.e., there is no traction backflow current on the running rail of this section.

The described DC traction substation 1 with two-level output can be the existing DC traction substation in the traditional DC power supply system for rail transport, and the described positive voltage feeder 2 can be composed of third rail or overhead contact line.

Figure 3:
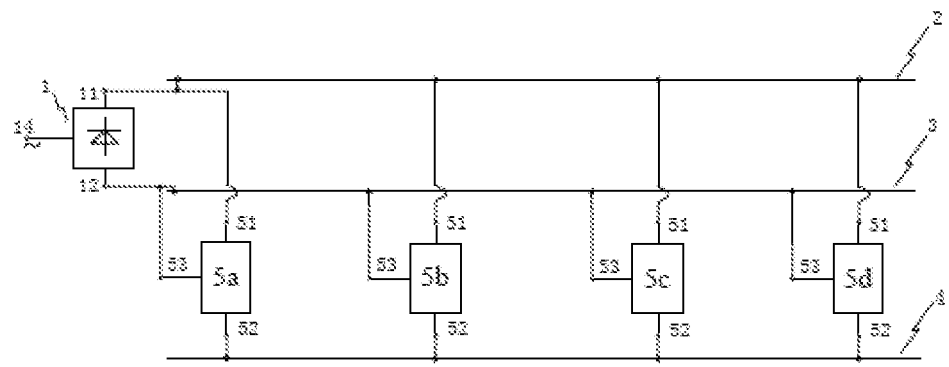
FIG. 3 (a) is a schematic diagram of Example 1 of Scheme 1 of this invention.
Figure 3:
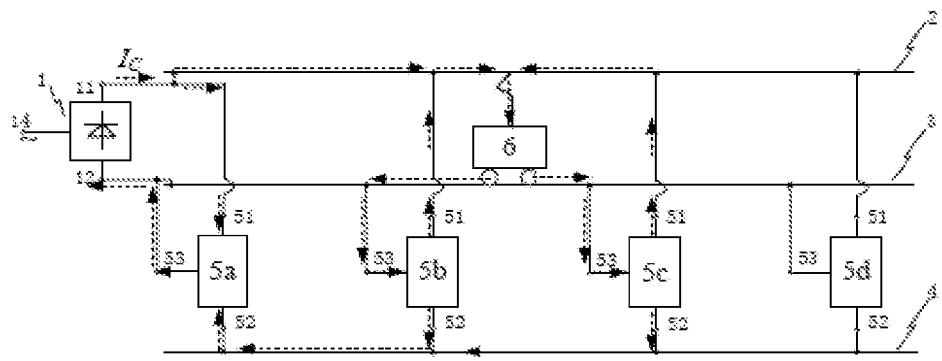
Figure 3:
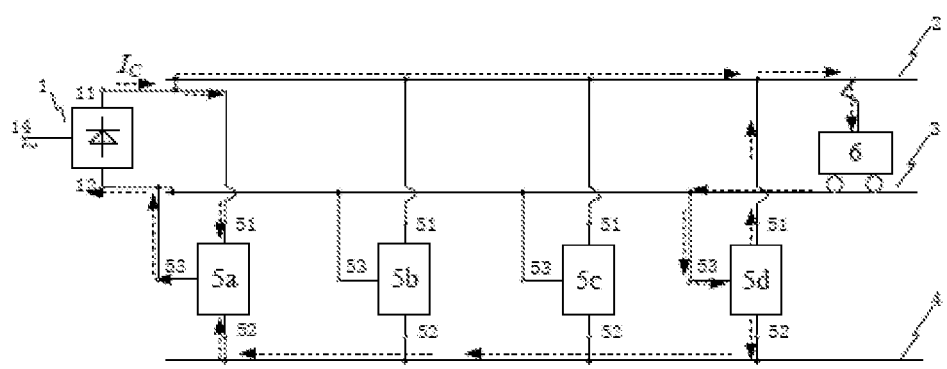
Figure 3:
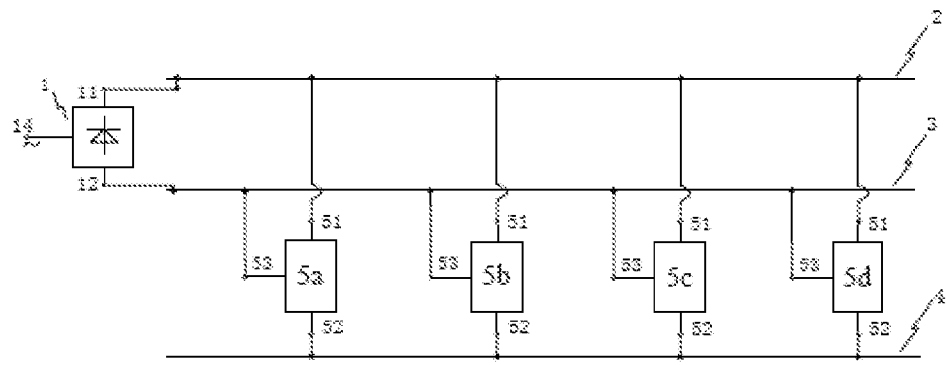

On the basis of the above technical scheme, the DC traction substation can use unilateral or bilateral power supply. According to the different output level of DC traction substation, it can be divided into the following schemes:

Scheme 1 of the invention, as shown in FIG. 3 (*a, b, c, d*), unilateral power supply scheme of DC traction substation with two-level output.

Figure 4:
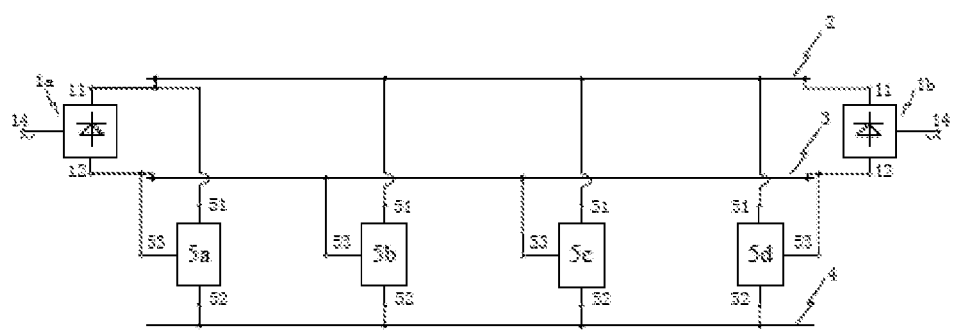
FIG. 4 (a) is a schematic diagram of Example 1 of Scheme 2 of this invention.
Figure 4:
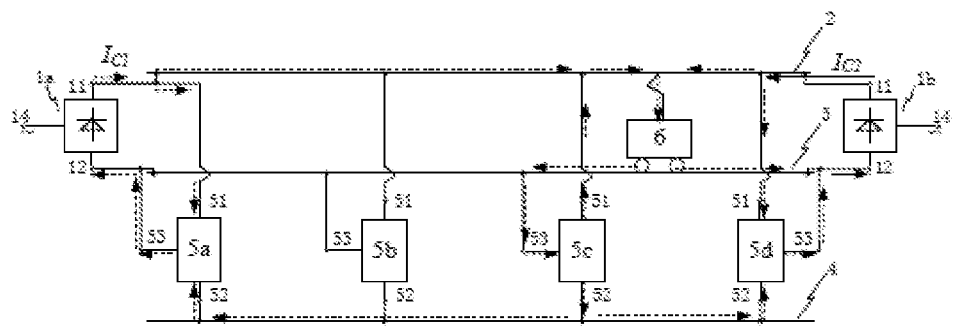
Figure 4:
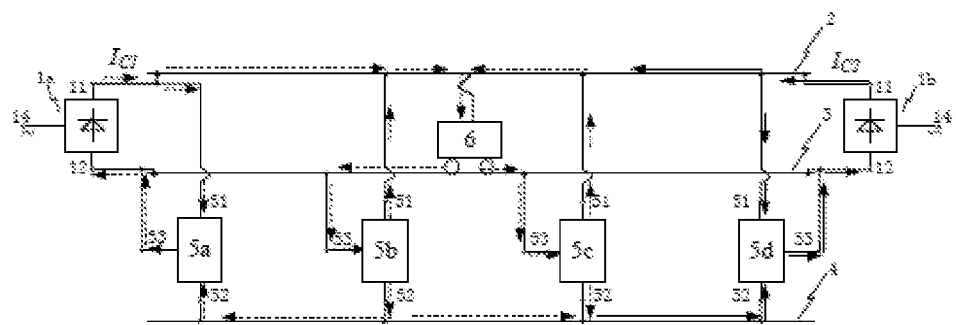
Figure 4:
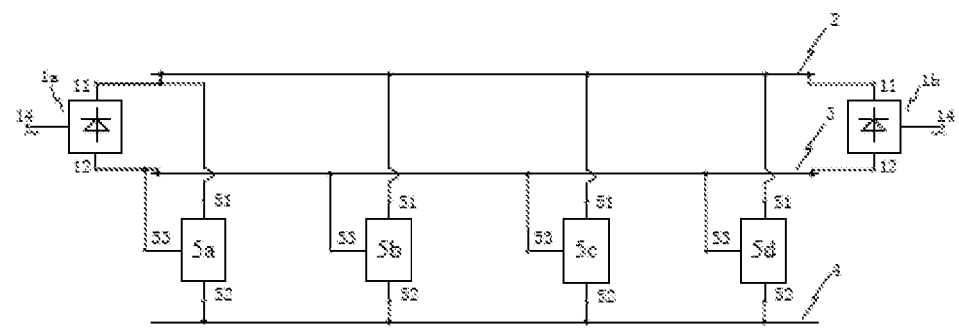
Figure 4:
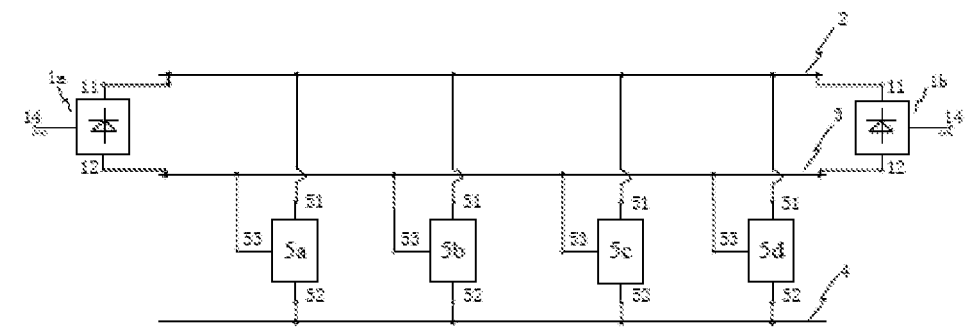

Scheme 2 of the invention, as shown in FIG. 4 (*a, b, c, d, e*), bilateral power supply scheme of DC traction substation with two-level output.

Figure 5:
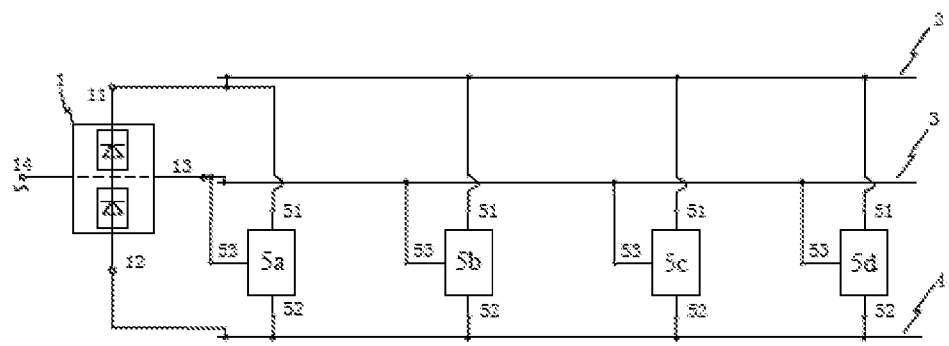
FIG. 5 (a) is a schematic diagram of Example 1 of Scheme 3 of this invention.
Figure 5:
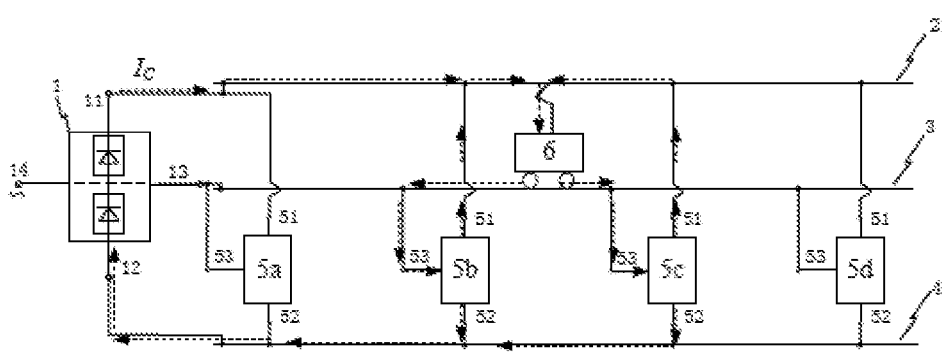
Figure 5:
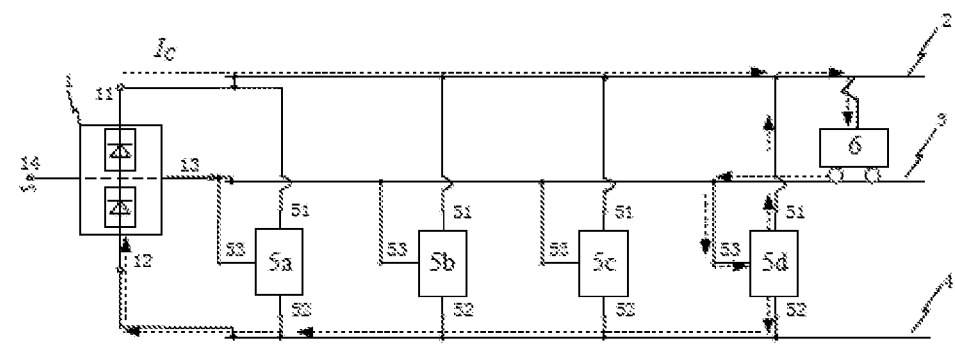
Figure 5:
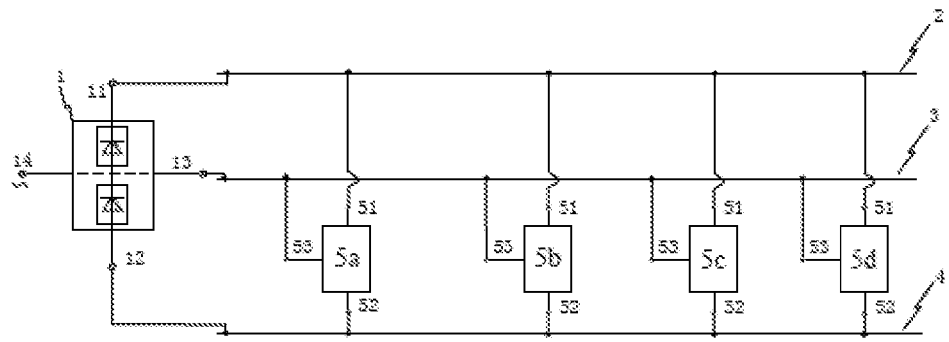

Scheme 3 of the invention, as shown in FIG. 5 (*a, b, c, d*), unilateral power supply scheme of DC traction substation with three-level output.

Figure 6:
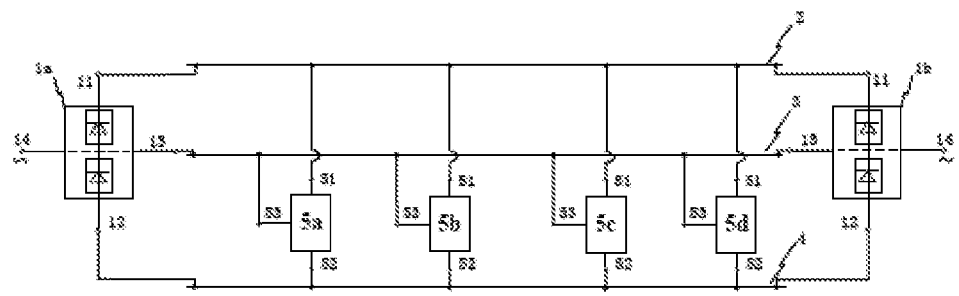
FIG. 6 (a) is a schematic diagram of Example 1 of Scheme 4 of this invention.
Figure 6:
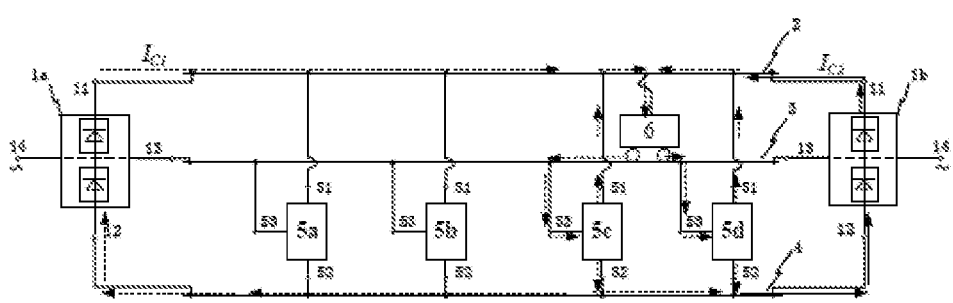
Figure 6:
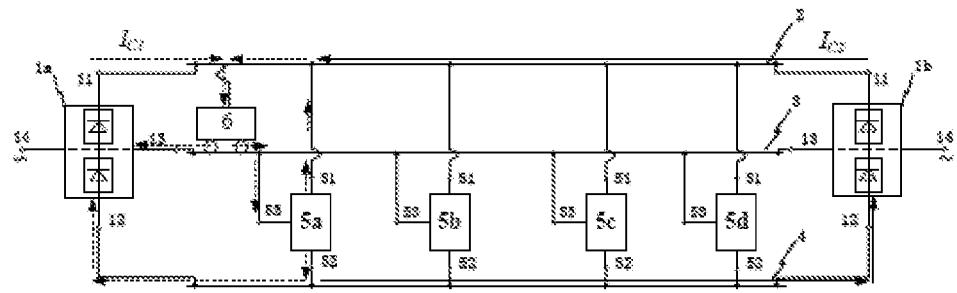
Figure 6:
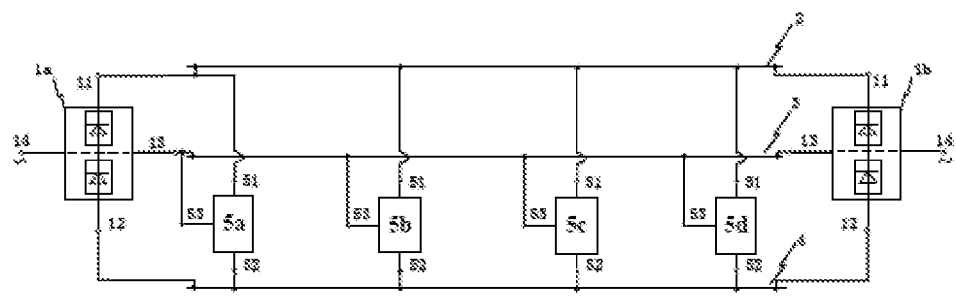
Figure 6:
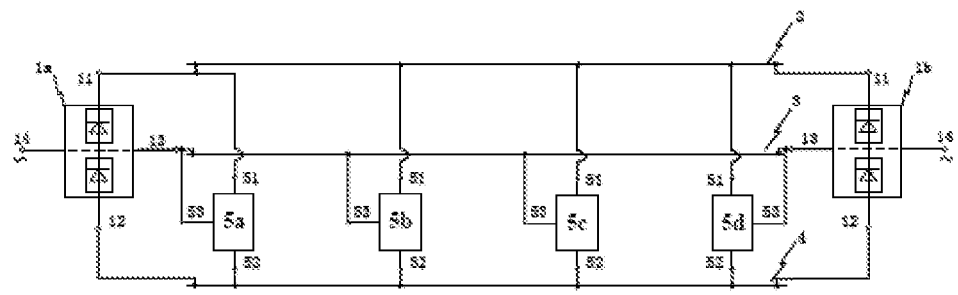

Scheme 4 of the invention, as shown in FIG. 6 (*a, b, c, d, e*), bilateral power supply scheme of DC traction substation with three-level output.

In Scheme 1 and Scheme 2, the output voltage value of DC traction substation 1 (namely, the voltage value between the positive end 11 and the negative end 12) is the value of the train 6.

In Scheme 3 and Scheme 4, the output voltage value of DC traction substation 1 (namely, the voltage value between the positive end 11 and the negative end 12) is larger than the value of the train 6, usually twice as much as that. And the voltage value between the positive end of DC traction substation 1 and the midpoint end 13 is the value of the train 6.

In Scheme 1-4, in order to facilitate the design and application of the system, the parameters of the DC converter 5 are generally designed: the voltage between the high potential terminal 51 and the neutral potential terminal 53, which is equal to the voltage between the neutral potential terminal 53 and the low potential terminal 52. When the DC converter works, the current of the high potential terminal and the low one is equal, and its direction is simultaneous inflow or outflow.

In Scheme 1-4, the number of DC converter and the distance of a running rail section between the two adjacent DC converters are determined by the output type of the DC traction substation (two levels of three levels), the length of power supply line (includes the positive voltage feeder, a running rail, the negative voltage backflow line, etc.), train's load and train running rail interval and other factors. The running rail section between the two adjacent DC converters 5 or between the DC converter 5 and the DC traction substation 1 only for one train running is optimization of the distance of running rail section.

For the convenience of illustration, in the Scheme 1-4 of the invention as shown in the FIGS. the four DC converters 5 is assumed to be designated as DC converter 5*a*, 5*b*, 5*c* and 5*d*, respectively. When there is no train 6 running on the running rail section between two adjacent DC converters, this section has no current in theory. The invention not only greatly reduces the loss of the power supply line, but also eliminates the stray current. In addition, after the capacitor in the DC converter is replaced by the energy storage unit such as super capacitor or battery, it can be used as regenerative braking energy storage device of a train.

On the basis of the above technical scheme, the DC traction substation 1 adopts multi pulse rectifier device, and the typical multi pulse rectifier devices are 24 pulses, 12 pulses or 18 pulses.

In the schematic diagram 3 (*a*) of Example 1 of Scheme 1 of this invention, the specific connection mode is as follows: the positive end 11 of the DC traction substation 1 is connected with the positive voltage feeder 2; the negative end 12 is connected with the running rail 3; the AC end 14 is connected with the AC input power supply. After being connected to the positive end 11, the high potential terminal 51 of the DC converter 5a which is not most adjacent to DC traction substation 1 is connected to the positive voltage feeder 2. After being connected to the negative end 12 of the DC traction substation 1, the neutral potential terminal 53 is connected to the running rail 3.

The high potential terminals 51 of other converters 5b, 5c, and 5d are respectively connected to the positive voltage feeder 2, and the neutral potential terminals 53 are respectively connected to the running rail 3. The low potential terminals 52 of all converters 5a, 5b, 5c, and 5d are respectively connected to the negative voltage backflow line 4.

The working process of Example 1 of Scheme 1 of this invention is as follows:

As shown in FIG. 3 (*b*), when there is a train 6 running on the running rail 3 (a train runs on the running rail 3 between the DC converters 5b and 5c), for the current Ic output from the DC Traction Substation 1.

A part is transmitted to the train 6 through the positive voltage feeder 2. The current from the train 6 back to the DC traction substation 1 is first transmitted to the running rail 3 through the train 6, and then transmitted to DC converters 5b and 5c which are the most adjacent to two ends of the train 6 through the neutral potential terminal 53, and then to the negative voltage backflow current line 4 through the low potential terminals 52 of DC converters 5b and 5c, and then return to the DC traction substation 1 through the low potential terminals 52 and the neutral potential terminal 53 of the DC converter 5a which is the most adjacent to the DC traction substation 1.

The other part flows into the high potential terminal 51 of the DC converter 5a which is the most adjacent to the DC traction substation 1, and then return to the DC traction substation 1 through the neutral potential terminal 53 of the DC converter 5a.

In this scheme, the current from the train 6 back to the DC traction substation 1 is passed through the section of the running rail 3 with the train running and the negative voltage backflow current line 4 between the sections with no train running.

As shown in FIG. 3 (*c*), when there is a train 6 running on the running rail 3 (a train runs on the running rail 3 on the right side of the DC converter 5d), for the current Ic output from the DC Traction Substation 1. A part is transmitted to the train 6 through the positive voltage feeder 2. The current from the train 6 back to the DC traction substation 1 is first transmitted to the running rail 3 through the train 6, and then transmitted to DC converters 5d which are the most adjacent to one end of the train 6 through the neutral potential terminal 53, and then to the negative voltage backflow current line 4 through the low potential terminals 52 of DC converters 5d, and then return to the DC traction substation 1 through the low potential terminals 52 and the neutral potential terminal 53 of the DC converter 5a which is the most adjacent to the DC traction substation 1. At the same time, the part of the current output from the high potential terminal 51 of the DC converter 5d is directly feedback to the train 6.

The other part flows into the high potential terminal 51 of the DC converter 5a which is the most adjacent to the DC traction substation 1, and then return to the DC traction substation 1 through the neutral potential terminal 53 of the DC converter 5a.

In the schematic diagram 3 (d) of Example 2 of Scheme 1 of this invention, the specific connection mode is as follows:

The positive end 11 of the DC traction substation 1 is connected with the positive voltage feeder 2; the negative end 12 is connected with the running rail 3; the AC end 14 is connected with the AC input power supply; the high potential terminals 51 of the DC converter 5a, 5b, 5c, 5d are respectively connected to the positive voltage feeder 2; the low potential terminals 52 of the DC converter 5a, 5b, 5c, 5d are respectively connected to the negative voltage backflow current line 4; the neutral potential terminal 53 of the DC converter 5a, 5b, 5c, 5d are respectively connected to the running rail 3.

Obviously, in the schematic diagram 3 (d) of Example 2 of Scheme 1 of this invention, when there is a train 6 running at any position of the running rail 3, on the running rail section between the negative end 12 of the DC traction substation 1 and the neutral potential terminal 53 of the most adjacent DC converter 5a, flows through all the traction backflow currents that return to the negative end 12 of the DC traction substation 1.

In the schematic diagram 4 (a) of Example 1 of Scheme 2 of this invention, the specific connection mode is as follows: the positive end 11 of the DC traction substations 1a and 1b are respectively connected with the positive voltage feeder 2; the negative end 12 of the DC traction substations 1a and 1b are respectively connected with the running rail 3; the AC ends 14 of the DC traction substations 1a and 1b are respectively connected with the AC input power supply.

After being respectively connected with the positive end 11 of the DC traction substations 1a and 1b, the high potential terminals 51 of the DC converter 5a, 5d which are the most adjacent to the DC traction substations 1a and 1b are respectively connected with the positive voltage feeder 2. And after being respectively connected with the negative end 12 of the DC traction substations 1a and 1b, the neutral potential terminals 53 are respectively connected with the running rail 3.

The high potential terminals 51 of other DC converter 5b and 5c are respectively connected with the positive voltage feeder 2. And the neutral potential terminals 53 are respectively connected with the running rail 3.

The low potential terminals 52 of all DC converter 5a, 5b, 5c, 5d are respectively connected with the negative voltage backflow current line 4.

The working process of Example 1 of Scheme 2 of this invention is as follows:

As shown in FIG. 4 (*b*), when there is a train 6 running on the running rail 3 (a train runs on the running rail 3 between the DC converters 5c and 5d), for the current Ic1 and Ic2 output from the DC Traction Substations 1a and 1b.

A part is transmitted to the train 6 through the positive voltage feeder 2. The current from the train 6 back to the DC traction substation 1a and 1b is first transmitted to the running rail 3 through the train 6, and then divided into two ways. One way (a part of Ic2) directly returns to the DC traction substation 1b through the negative end of the DC traction substation 1b near the DC converters 5d which is the most adjacent to one end of the train 6. And the other way is transmitted to the DC converters 5c which is the most adjacent to one end of the train 6 through the neutral potential terminal 53, and then transmitted to the negative voltage backflow current line 4 through the low potential terminals 52 of DC converters 5c, then returns to the DC traction substation 1a through the low potential terminals 52 and the neutral potential terminal 53 of the DC converter 5a which is the most adjacent to the DC traction substation 1a. At the same time, it returns to the DC traction substation 1b through the low potential terminals 52 and the neutral potential terminal 53 of the DC converter 5d which is the most adjacent to the DC traction substation 1b.

Another part flows into the high potential terminal 51 of the DC converter 5a which is the most adjacent to the DC traction substation 1a, and then return to the DC traction substation 1a through the neutral potential terminal 53 of the DC converter 5a.

The other part flows into the high potential terminal 51 of the DC converter 5d which is the most adjacent to the DC traction substation 1b, then return to the DC traction substation 1b through the neutral potential terminal 53 of the DC converter 5d.

As shown in the FIG. 4 (c), when there is a train 6 running on the running rail 3 (a train runs on the running rail 3 between the DC converters 5b and 5c), for the current Ic1 and Ic2 output from the DC Traction Substations 1a and 1b, A part is transmitted to the train 6 through the positive voltage feeder 2. The current from the train 6 back to the DC traction substations 1a and 1b is first transmitted to the running rail 3 through the train 6, and then transmitted to DC converters 5b and 5c which are the most adjacent to two ends of the train 6 through the neutral potential terminal 53, and then to the negative voltage backflow current line 4 through the low potential terminals 52 of the DC converters 5b and 5c, and then return to the DC traction substation 1a through the low potential terminals 52 and the neutral potential terminal 53 of the DC converter 5a which is the most adjacent to the DC traction substation 1a. it returns to the DC traction substation 1b through the low potential terminals 52 and the neutral potential terminal 53 of the DC converter 5d which is the most adjacent to the DC traction substation 1b.

Another part flows into the high potential terminal 51 of the DC converter 5a which is the most adjacent to the DC traction substation 1a, and then return to the DC traction substation 1a through the neutral potential terminal 53 of the DC converter 5a.

The other part flows into the high potential terminal 51 of the DC converter 5d which is the most adjacent to the DC traction substation 1b, then return to the DC traction substation 1b through the neutral potential terminal 53 of the DC converter 5d.

In the schematic diagram 4 (d) of Example 2 of Scheme 2 of this invention, the specific connection mode is as follows: the positive end 11 of the DC traction substations 1a and 1b are respectively connected with the positive voltage feeder 2; the negative end 12 of the DC traction substations 1a and 1b are respectively connected with the running rail 3; the AC ends 14 of the DC traction substations 1a and 1b are respectively connected with the AC input power supply.

After being connected with the positive end 11 of the DC traction substation 1a, the high potential terminals 51 of the DC converter 5a which is the most adjacent to the DC traction substation 1a is connected with the positive voltage feeder 2. And after being connected with the negative end 12 of the DC traction substation 1a, the neutral potential terminal 53 is connected with the running rail 3.

The high potential terminals 51 of other DC converter 5b, 5c and 5d are respectively connected with the positive voltage feeder 2. And the neutral potential terminals 53 are respectively connected with the running rail 3.

The low potential terminals 52 of all DC converters 5a, 5b, 5c, 5d are respectively connected with the negative voltage backflow current line 4.

In the schematic diagram 4 (e) of Example 3 of Scheme 2 of this invention, the specific connection mode is as follows: the positive end 11 of the DC traction substations 1a and 1b are respectively connected with the positive voltage feeder 2; the negative end 12 of the DC traction substations 1a and 1b are respectively connected with the running rail 3; the AC ends 14 of the DC traction substations 1a and 1b are respectively connected with the AC input power supply; the high potential terminals 51 of all DC converters are respectively connected with the positive voltage feeder 2.

The neutral potential terminals 53 of all DC converters 5a, 5b, 5c, 5d are respectively connected with the running rail 3.

The low potential terminals 52 of all DC converters 5a, 5b, 5c, 5d are respectively connected with the negative voltage backflow current line 4.

Obviously, in FIG. 4 (d) and FIG. 4 (e), when there is a train 6 running at any position of the running rail 3, on the running rail section between the negative end 12 of the DC traction substation 1b and the neutral potential terminal 53 of the most adjacent DC converter 5d, flows through all the traction backflow currents that return to the negative end 12 of the DC traction substation.

While in the schematic diagram 4 (b) and 4 (c) of Example 1 of Scheme 2 of this invention, the current flow out from the neutral potential terminal 53 of DC converter 5d which is the most adjacent to the DC traction substation 1b directly returns to the DC traction substation 1 through then connecting point of the neutral potential terminal 53 of the DC converter 5d and the negative end 12 of the DC traction substation 1b instead of flowing through the running rail 3. In FIG. 4 (b), there is a train 6 running on the running rail section near the point, so there are two currents in the opposite direction on this section, and a sum of absolute values of the currents is equal to the full traction backflow of the train 6. In FIG. 4 (c) there is no train 6 running on the section, so there is no current on this section.

It is shown in the Scheme 1 and Scheme 2 of the invention that if the DC traction substation 1 is two-level output, and there is a train 6 running on the running rail.

In the case that at least one section of the most adjacent running rail sections on both sides of the connecting point between the neutral potential terminal 53 of the DC converter 5 which is not most adjacent to the DC traction substation 1 and the running rail 3 has a train 6 running, there is current on this section and the DC converter 5 transfers the current from the train 6 to the running rail 3 into output of high potential terminal 51 and output of low potential terminal 52 through input of the neutral potential terminal 53, of which output current of high potential terminal 51 is fed back to the train 6 through the positive voltage feeder 4, and output current of low potential terminal 52 is transmitted to the negative voltage backflow line (4).

The DC converter 5 which is the most adjacent to DC traction substation 1 converts the current of the negative voltage backflow line 4 flowed from the low potential terminal 52 and the current of the positive voltage feeder 4 flowed from the high potential terminal 51 into the output current of the neutral potential terminal 53. Then this output current is directly returned to the DC traction substation 1 which supplies power for the train 6.

In the case that the most adjacent running rail sections on both sides of the connecting point between the neutral potential terminal 53 of the DC converter 5 which is not most adjacent to DC traction substation 1 and the running rail 3 has no train 6 running, there is no current on the sections and three terminals of the DC converter 5.

When the neutral potential terminal 53 of the DC converter 5 which is the most adjacent to DC traction substation 1 is connected to the running rail 3 after being connected to the negative end 12 of the DC traction substation 1, the current of the running rail 3 near the DC traction substation 1 is minimum.

When the neutral potential terminal 53 of the DC converter 5 which is the most adjacent to DC traction substation 1 and the negative 12 of the DC traction substation 1 are respectively connected to the running rail 3, on the running rail section between the negative end 12 of the DC traction substation 1 and the neutral potential terminal 53 of the most adjacent DC converter 5, flows through all the traction backflow currents that return to the DC traction substation 1.

In the schematic diagram 5 (a) of Example 1 of Scheme 3 of this invention, the specific connection mode is as follows: the positive end 11 (the positive level output) of the DC traction substation 1 is connected with the positive voltage feeder 2; the negative end 12 (the negative level output) of the DC traction substation 1 is connected with the negative voltage backflow current line 4; the midpoint end 13 (the neutral level output) of the DC traction substation 1 is connected with the running rail 3; the AC end 14 of the DC traction substation 1 is connected with the AC input power supply.

After being connected with the positive end 11 of the DC traction substation 1, the high potential terminal 51 of the DC converter 5a which is the most adjacent to the DC traction substation 1 is connected with the positive voltage feeder 2. After being connected with the midpoint end 13 of the DC traction substation 1, the neutral potential terminal 53 is connected with the running rail 3.

The high potential terminals 51 of other converters 5b, 5c, and 5d are respectively connected to the positive voltage feeder 2, and the neutral potential terminals 53 are respectively connected to the running rail 3.

The low potential terminals 52 of all converters 5a, 5b, 5c, and 5d are respectively connected to the negative voltage backflow line 4.

The working process of Example 1 of Scheme 3 of this invention is as follows.

As shown in FIG. 5 (b), when there is a train 6 running on the running rail 3 (a train runs on the running rail 3 between the DC converters 5b and 5c), the current Ic output from the DC traction substation 1 is transmitted to the train 6 through the positive voltage feeder 2. The traction backflow current from the train 6 back to the DC traction substation 1 is first transmitted to the running rail 3 through the train 6, and then transmitted to DC converters 5b and 5c which are the most adjacent to two ends of the train 6 through the neutral potential terminal 53, and then to the negative voltage backflow current line 4 through the low potential terminals 52 of DC converters 5b and 5c, and then return to the DC traction substation 1 through the negative end 12 of the DC traction substation 1.

As shown in FIG. 5 (c), when there is a train 6 running on the running rail 3 (a train runs on the running rail 3 on the right side of the DC converter 5d), the current Ic output from the DC Traction Substation 1 is transmitted to the train 6 through the positive voltage feeder 2. The traction backflow current from the train 6 back to the DC traction substation 1 is first transmitted to the running rail 3 through the train 6, and then transmitted to DC converters 5d which are the most adjacent to one end of the train 6 through the neutral potential terminal 53, and then to the negative voltage backflow current line 4 through the low potential terminals 52 of DC converters 5d, and then return to the DC traction substation 1 through the negative end 12 of the DC traction substation 1.

In the schematic diagram 5 (d) of Example 2 of Scheme 3 of this invention, the specific connection mode is as follows: the positive end 11 (the positive level output) of the DC traction substation 1 is connected with the positive voltage feeder 2; the negative end 12 (the negative level output) of the DC traction substation 1 is connected with the negative voltage backflow current line 4; the midpoint end 13 (the neutral level output) of the DC traction substation 1 is connected with the running rail 3.

The AC end 14 of the DC traction substation 1 is connected with the AC input power supply; the high potential terminal 51 of the DC converters 5a, 5b, 5c and 5d are respectively connected with the positive voltage feeder 2; the low potential terminal 52 of the DC converters 5a, 5b, 5c and 5d are respectively connected with the negative voltage backflow line 4; the neutral potential terminal 53 of the DC converters 5a, 5b, 5c and 5d are respectively connected with the running rail 3.

In the schematic diagram 6 (a) of Example 1 of Scheme 4 of this invention, the specific connection mode is as follows: the positive ends 11 (the positive level output) of the DC traction substations 1a and 1b are respectively connected with the positive voltage feeder 2; the negative ends 12 (the negative level output) of the DC traction substations 1a and 1b are respectively connected with the negative voltage backflow current line 4; the midpoint ends 13 (the neutral level output) of the DC traction substations 1a and 1b are respectively connected with the running rail 3.

The AC end 14 of the DC traction substation 1 is connected with the AC input power supply; the high potential terminal 51 of the DC converters 5a, 5b, 5c and 5d are respectively connected with the positive voltage feeder 2; the low potential terminal 52 of the DC converters 5a, 5b, 5c and 5d are respectively connected with the negative voltage backflow line 4; the neutral potential terminal 53 of the DC converters 5a, 5b, 5c, and 5d are respectively connected with the running rail 3.

The working process of Example 1 of Scheme 4 of this invention is as follows.

As shown in FIG. 6 (b), when there is a train 6 running on the running rail 3 (a train runs on the running rail 3 between the DC converters 5c and 5d), the current Ic1 and Ic2 output from the DC traction substations 1a and 1b, are transmitted to the train 6 through the positive voltage feeder 2. The traction backflow current from the train 6 back to the DC traction substations 1a and 1b are first transmitted to the running rail 3 through the train 6, and then transmitted to DC converters 5b and 5c which are the most adjacent to two ends of the train 6 through the neutral potential terminal 53, and then to the negative voltage backflow current line 4 through the low potential terminals 52 of the DC converters 5b and 5c, and then return to the DC traction substations 1a and 1b through the negative end 12 of the DC traction substation s 1a and 1b.

As shown in FIG. 6 (c), when there is a train 6 running on the running rail 3 (a train runs on the running rail 3 between the DC converter 5a and the DC traction substation 1a), the current Ic1 and Ic2 output from the DC traction substations 1a and 1b, are transmitted to the train 6 through the positive voltage feeder 2. The traction backflow current from the train 6 back to the DC traction substations 1a and 1b are first transmitted to the running rail 3 through the train 6. A part of the current returns to the midpoint end 13 of the DC traction substation 1a through the running rail 3. And the other part is transmitted to the DC converter 5a which is the most adjacent to the train 6 through the neutral potential terminal 53, and then transmitted to the negative voltage backflow line 4 through the low potential terminal 52 of the DC converter 5a. And then a part of the Ic1 and Ic2 respectively return to the DC traction substations 1a and 1b through the negative ends 12 of the DC traction substations 1a and 1b.

In the schematic diagram 6 (d) of Example 2 of Scheme 4 of this invention, the specific connection mode is as follows: the positive ends 11 (the positive level output) of the DC traction substations 1a and 1b are respectively connected with the positive voltage feeder 2; the negative ends 12 (the negative level output) of the DC traction substations 1a and 1b are respectively connected with the negative voltage backflow current line 4; the midpoint ends 13 (the neutral level output) of the DC traction substations 1a and 1b are respectively connected with the running rail 3.

The AC ends 14 of the DC traction substation 1a and 1b are respectively with the AC input power supply; after being connected with the positive end 11 of the DC traction substation 1a, the high potential terminal 51 of the DC converter 5a which is the most adjacent to the DC traction substation 1a is connected with the positive voltage feeder 2. After being connected with the midpoint end 13 of the DC traction substation 1a, the neutral potential terminal 53 is connected with the running rail 3.

The high potential terminals 51 of other converters 5b, 5c, and 5d are respectively connected to the positive voltage feeder 2, and the neutral potential terminals 53 are respectively connected to the running rail 3; the low potential terminals 52 of all converters 5a, 5b, 5c and 5d are respectively connected to the negative voltage backflow line 4.

In the schematic diagram 6 (e) of Example 3 of Scheme 4 of this invention, the specific connection mode is as follows: the positive ends 11 (the positive level output) of the DC traction substations 1a and 1b are respectively connected with the positive voltage feeder 2; the negative ends 12 (the negative level output) of the DC traction substations 1a and 1b are respectively connected with the negative voltage backflow current line 4; the midpoint ends 13 (the neutral level output) of the DC traction substations 1a and 1b are respectively connected with the running rail 3.

The AC ends 14 of the DC traction substation 1a and 1b are respectively with the AC input power supply; after being connected with the positive end 11 of the DC traction substations 1a and 1b, the high potential terminals 51 of the DC converters 5a and 5b which are the most adjacent to the DC traction substations 1a and 1b are connected with the positive voltage feeder 2. After being connected with the midpoint ends 13 of the DC traction substations 1a and 1b, the neutral potential terminals 53 are connected with the running rail 3.

The high potential terminals 51 of other converters 5b, 5c are respectively connected to the positive voltage feeder 2, and the neutral potential terminals 53 are respectively connected to the running rail 3. The low potential terminals 52 of all converters 5a, 5b, 5c and 5d are respectively connected to the negative voltage backflow line 4.

It is shown in the Scheme 3 and Scheme 4 of the invention that if the DC traction substation 1 is three-level output, and there is a train 6 running on the running rail.

In the case that at least one section of the most adjacent running rail sections on both sides of the connecting point between the neutral potential terminal 53 of the DC converter 5 and the running rail 3 has a train 6 running, the DC converter 5 transfers the current from the train 6 to the running rail 3 into output of high potential terminal 51 and output of low potential terminal 52 through input of the neutral potential terminal 53, of which output current of high potential terminal 51 is fed back to the train 6 through the positive voltage feeder 2, and output current of low potential terminal 52 is directly returned to the DC traction substation 1 through its negative end 12 after being transmitted to the negative voltage backflow line 4.

In the case that the most adjacent running rail sections on both sides of the connecting point between the neutral potential terminal 53 of the DC converter 5 and the running rail 3 has no train 6 running, there is no current on the sections and three terminals of the DC converter 5.

When the neutral potential terminal 53 of the DC converter 5 which is the most adjacent to the DC traction substation 1 and the midpoint end 13 of the DC traction substation 1 are respectively connected to the rail line 3, and when the running rail section between these two connecting points has a train 6 running, the current from the positive end 11 of the DC traction substation 1 and the current from the negative end 12 are not equal.

Figure 7:
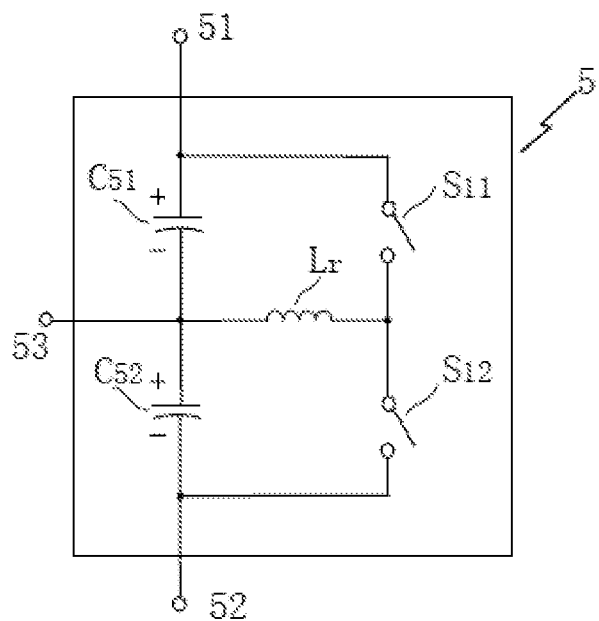
FIG. 7 (a) is a schematic diagram of Example 1 of negative voltage DC converter of this invention.
Figure 7:
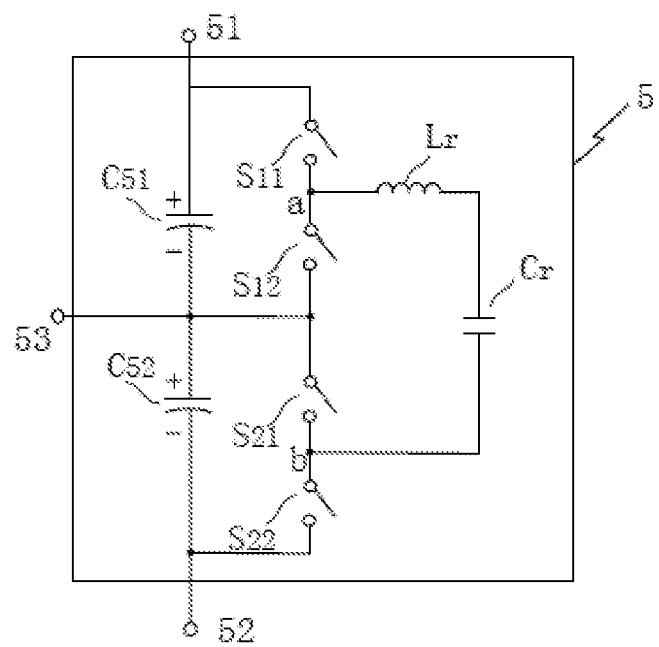

In FIG. 7 (a), it is the first embodiment of the DC converter 5 of the invention.

The anode of the switch S11 is connected with the positive pole of the capacitor C51, whose connecting point is used as the high potential terminal 51 of the DC converter 5. The cathode of the switch S12 is connected with the negative pole of the capacitor C52, whose connecting point is used as the low potential terminal 52 of the DC converter 5. The negative pole of the capacitor C51 is connected with the positive pole of the capacitor C52, whose connecting point is used as the neutral potential terminal 53 of the DC converter 5. The cathode of the switch S11 is connected with the anode of the switch S12, whose connecting point is connected with the neutral potential terminal 53 through the inductance Lr.

After the capacitor C51 and C2 are replaced by or partially replaced by the energy storage unit such as super capacitor or battery, the DC converter 5 not only has a function of negative voltage conversion, but also has a function of regenerative braking energy storage in train.

In FIG. 7 (b), it is the second embodiment of the DC converter 5 of the invention.

The anode of the switch S11 is connected with the positive pole of the capacitor C51, whose connecting point is used as the high potential terminal 51 of the DC converter 5. The cathode of the switch S22 is connected with the negative pole of the capacitor C52, whose connecting point is used as the low potential terminal 52 of the DC converter 5. The negative pole of the capacitor C51 is connected with the positive pole of the capacitor C52, whose connecting point is used as the neutral potential terminal 53 of the DC converter 5. The cathode of the switch S12 is connected with the anode of the switch S21, whose connecting point is used as the neutral potential terminal 53. The cathode of the switch S11 is connected with the anode of the switch S12, and the connecting point is a. The cathode of the switch S21 is connected with the anode of the switch S22, and the connecting point is b. The inductance Lr and the capacitor Cr are connected in series to form a resonant branch, and the two terminals of the resonant branch are connected to the connection point a and the connection point b respectively.

After the capacitor C51 and C2 are replaced by or partially replaced by the energy storage unit such as super capacitor or battery, the DC converter 5 not only has a function of negative voltage conversion, but also has a function of regenerative braking energy storage in train.

Figure 8:
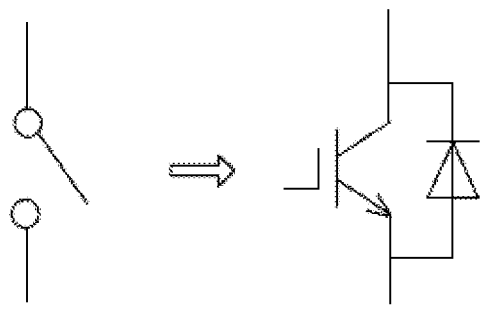
FIG. 8 (a) is a schematic diagram of Example 1 of a switch in a negative voltage DC converter.
Figure 8:
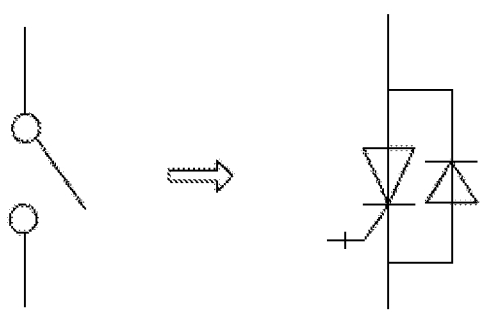

On the basis of the above technical scheme, the switch in the DC converter can be implemented as shown in FIG. 8 (*a*) which is the IGBT equivalent diagram of the semiconductor power switch. And it can also be implemented as shown in FIG. 8 (*b*) which is the IGCT equivalent diagram of the semiconductor power switch.

The above are only better specific implementations of the invention, but are not limited to the scope of the invention. Any change or replacements that can be easily thought of by any technical personnel in this technical field within the scope of the technology disclosed herein shall be covered within the scope of protection of the invention. Therefore, the scope of protection of the invention should be based on the scope of protection of the right.

The content without being described in this instruction belongs to the current technology known to professional and technical personnel in this field.

What is claimed is:

1. A negative voltage backflow direct current supply system for a rail transport comprising: a DC traction substation with two-level output or three-level output (1), a positive voltage feeder (2), a running rail (3), a negative voltage backflow line (4) and a plurality of DC converters (5);
    said negative voltage backflow line (4) is arranged along the running rail (3);
    said a plurality of DC converters are arranged along the running rail (3);
    when the DC traction substation is two-level output, a connecting mode is: a positive end (11) of the DC traction substation (1) is connected to the positive voltage feeder (2), a negative end (12) of the DC traction substation (1) is connected to the running rail (3), a high potential terminal (51) of the DC converter (5) is connected to the positive voltage feeder (2), a neutral potential terminal (53) of the DC converter (5) is connected to the running rail (3), and a low potential terminal (52) of the DC converter (5) is connected to the negative voltage backflow line (4);
    when the DC traction substation is three-level output, a connecting mode is: a positive end (11) of the DC traction substation (1) is connected to the positive voltage feeder (2), the midpoint (13) of the DC traction substation (1) is connected to the running rail (3), the negative end (12) of the DC traction substation (1) is connected to the negative voltage backflow line (4), a high potential terminal (51) of the DC converter (5) is connected to the positive voltage feeder (2), a neutral potential terminal (53) of the DC converter (5) is connected to the running rail (3), and a low potential terminal (52) of the DC converter (5) is connected to the negative voltage backflow line (4).

2. The system of claim 1, wherein, a current of the DC converter (5) flows in from the neutral potential terminal (53) and flows out from the high potential terminal (51) and the low potential terminal (52) simultaneously, the voltage value between the high potential terminal (51) and the neutral potential terminal (53) is equal or unequal to the value between the neutral potential terminal (53) and the low potential terminal (52), when the values are equal, the current values of the high potential terminal (51) and the low potential terminal (52) simultaneously flows in or flows out are also equal.

3. The system of claim 1, wherein, the number of DC converter (5) and the distance of a running rail section between the two adjacent DC converters (5) are determined by the number of output level of the DC traction substation, the length of power supply line, train's load and train running rail interval and other factors; the running rail section between the two adjacent DC converters (5) or between the DC converter (5) and the DC traction substation (1) only for one train running is optimization of the distance of running rail section.

4. The system of claim 1, wherein, when the DC traction substation is two-level output and there is a train on the running rail;
    in the case that at least one section of the most adjacent running rail sections on both sides of the connecting point between the neutral potential terminal (53) of the DC converter (5) which is not most adjacent to the DC traction substation (1) and the running rail (3) has a train (6) running, the DC converter (5) transfers the current from the train (6) to the running rail (3) into output of high potential terminal (51) and output of low potential terminal (52) through input of the neutral potential terminal (53), of which output current of high potential terminal (51) is fed back to the train (6), and output current of low potential terminal (52) is transmitted to the negative voltage backflow line (4);
    the DC converter (5) which is the most adjacent to DC traction substation (1) converts the current of the negative voltage backflow line (4) flowed from the low potential terminal (52) and the current of the positive voltage feeder (2) flowed from the high potential terminal (51) into the output current of the neutral potential terminal (53); then this output current is directly returned to the DC traction substation (1) which supplies power for the train (6);
    in the case that the most adjacent running rail sections on both sides of the connecting point between the neutral potential terminal (53) of the DC converter (5) which is not most adjacent to DC traction substation (1) and the running rail (3) has no train (6) running, there is no current on the sections and three terminals of the DC converter (5).

5. The system of claim 4, wherein, when the neutral potential terminal (53) of the DC converter (5) which is the most adjacent to DC traction substation (1) is connected to the running rail (3) after being connected to the negative end (12) of the DC traction substation (1), and when the running rail has a train running, the current of the most adjacent running rail sections on both sides of the connecting point between the DC traction substation (1) and the running rail (3) is minimum.

6. The system of claim 1, wherein, when the DC traction substation is three-level output and there is a train on the running rail;
    in the case that at least one section of the most adjacent running rail sections on both sides of the connecting point between the neutral potential terminal (53) of the DC converter (5) and the running rail (3) has a train (6) running, the DC converter (5) transfers the current from the train (6) to the running rail (3) into output of high potential terminal (51) and output of low potential terminal (52) through input of the neutral potential terminal (53), of which output current of high potential terminal (51) is fed back to the train (6), and output current of low potential terminal (52) is directly returned to the DC traction substation (1) through its negative end (12) after being transmitted to the negative voltage backflow line (4);
    in the case that the most adjacent running rail sections on both sides of the connecting point between the neutral potential terminal (53) of the DC converter (5) which is not most adjacent to DC traction substation (1) and the running rail (3) has no train (6) running, there is no current on the sections and three terminals of the DC converter (5).

7. The system of claim 6, wherein when the neutral potential terminal (53) of the DC converter (5) which is the most adjacent to DC traction substation (1) and the midpoint (13) of the DC traction substation (1) are respectively connected to the rail line (3), and when the running rail section between these two connecting points has a train (6) running, the current from the positive end (11) of the DC traction substation (1) and the current from the negative end (12) are not equal.

8. The system of claim 6, wherein, said DC converter (5) contains two sets of capacitors (C51) and (C52), of which one of the two sets of capacitors, (C51), is connected between the high potential terminal (51) and the neutral potential terminal (53) of the DC converter (5), and another of the two sets of capacitors, (C52), is connected between the neutral potential terminal (53) and the low potential terminal (52) of the DC converter (5).

9. The system of claim 8, wherein after the two sets of capacitors (C51) and (C52) of the DC converter are replaced or partially replaced by an energy storage unit, the DC converter (5) not only has a function of negative voltage conversion, but also has a function of regenerative braking energy storage in train.

10. The system of claim 1, wherein, a current of the DC converter (5) flows out from the neutral potential terminal (53) and flows in from the high potential terminal (51) and the low potential terminal (52) simultaneously; the voltage value between the high potential terminal (51) and the neutral potential terminal (53) is equal or unequal to the value between the neutral potential terminal (53) and the low potential terminal (52), when the values are equal, the current values of the high potential terminal (51) and the low potential terminal (52) simultaneously flows in or flows out are also equal.

* * * * *